June 7, 1960 S. MEURER 2,939,439
INTERNAL COMBUSTION ENGINE
Filed Sept. 2, 1958 3 Sheets-Sheet 1

INVENTOR
Siegfried Meurer

BY Bailey, Stephens & Huettig
ATTORNEYS

June 7, 1960 S. MEURER 2,939,439
INTERNAL COMBUSTION ENGINE
Filed Sept. 2, 1958 3 Sheets-Sheet 2
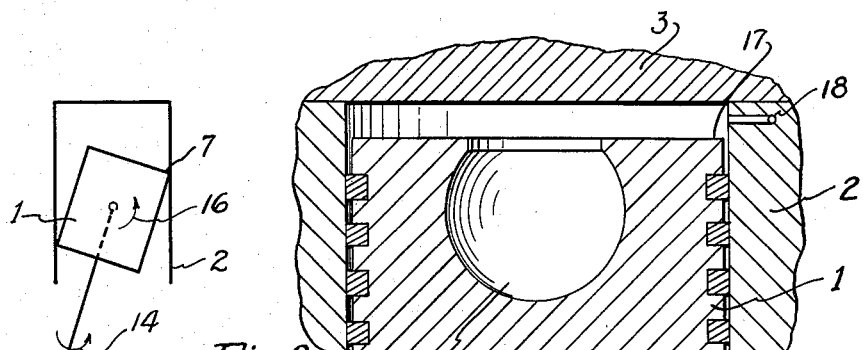
Fig.8
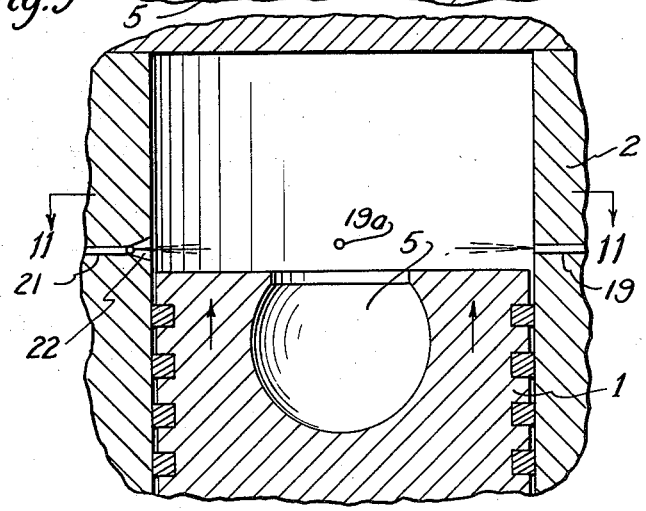
Fig.9
Fig.10
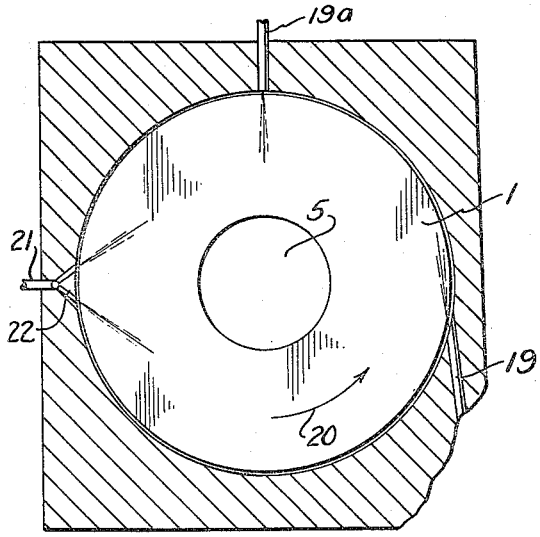
Fig.11
INVENTOR
Siegfried Meurer
BY Bailey, Stephens & Huettig
ATTORNEYS INVENTOR
Siegfried Meurer United States Patent Office 2,939,439
Patented June 7, 1960

2,939,439

INTERNAL COMBUSTION ENGINE

Siegfried Meurer, Nurnberg, Germany, assignor to Maschinenfabrik Augsburg-Nurnberg, A.G., Nurnberg, Germany Filed Sept. 2, 1958, Ser. No. 758,507

Claims priority, application Germany Aug. 30, 1957

20 Claims. (Cl. 123—32)

This invention relates to self-ignition internal combustion engines. In particular, the invention is an improvement in the engine disclosed in the copending application of Meurer and Seegelken, Serial No. 480,432, filed January 7, 1955, now Patent No. 2,907,308 dated October 6, 1959.

In the engine disclosed in the aforesaid application, the major portion of the fuel, but not more than 98 percent thereof, is injected and immediately applied to the wall of the combustion chamber without rebounding therefrom. The injection is such that as much as possible of the surface of the combustion chamber wall is covered with a film of fuel. The remaining portion of the fuel, about 2 percent and only enough so that an ignition noise is noticeable, is directly atomized in the air in the combustion chamber. The air sweeps over the film of fuel on the wall and mixes with the fuel vaporized therefrom. The compression ratio is chosen so that only the small percent of atomized fuel is self-ignited, but the major portion of the fuel is not self-ignited.

The object of this invention is to mix all of the air in the cylinder with fuel.

In the engine disclosed in application Serial No. 480,432, only from about 80 to 85 percent of the air in the cylinder is contained in the combustion chamber at the end of the compression stroke, while the remaining air fills the cylinder space between the cylinder head and the top dead center position of the piston. This space includes the valve pockets. In this disc-shaped space, the air contained at the end of the compression stroke either does not, or insufficiently, takes part in the formation of the fuel-air mixture and in the following combustion, unless certain requirements are met. Consequently, this invention improves upon the engine of Serial No. 480,432 by causing all of the air in the cylinder to take part in the combustion, and there is no unused air in the disc-shaped space at the end of the compression stroke.

In general, this is accomplished by injecting a part of the major portion of the fuel into the disc-shaped space above the top dead center position of the piston. The amount of fuel injected into this space is as required by the particular engine. However, the quantity of fuel injected into the disc-like space is not more than about 25 percent of the total injected fuel.

The means by which the objects of the invention are obtained are disclosed more fully with reference to the accompanying drawings, in which:

Figure 8 is a schematic view of the movement of a piston in a cylinder;

Figure 9 is a cross-sectional view of a modification of Figure 1;

Figure 10 is a further modification of Figure 9;

Figure 11 is a cross-sectional view on the line 11—11 of Figure 10;

Figure 12:
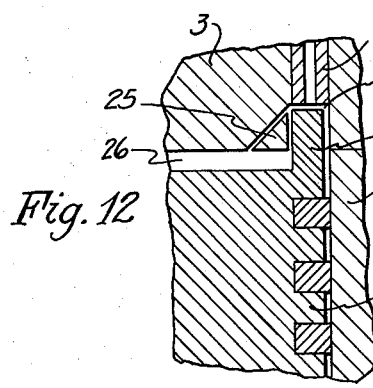
Figure 15:
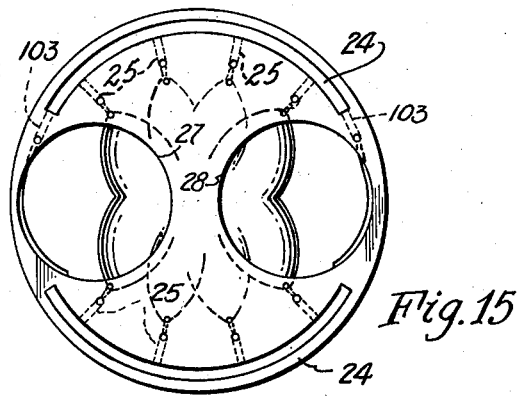
Figure 13:
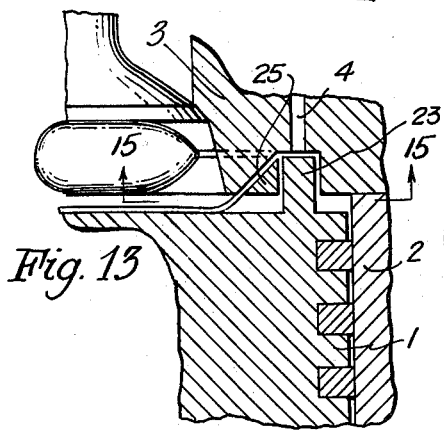
Figure 16:
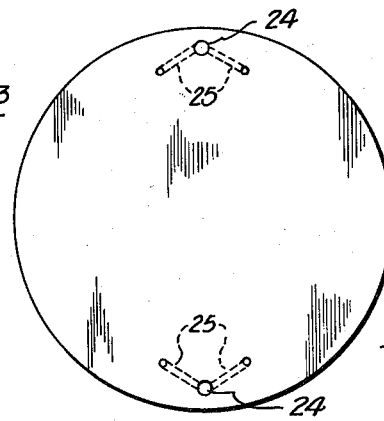
Figure 14:
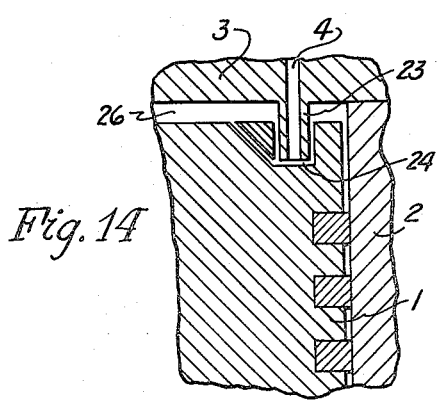

Figures 12, 13 and 14, respectively, are cross-sectional views of further modified forms of the invention;

Figure 15 is a cross-sectional view generally along the line 15—15 of Figure 13;

Figure 16 is a similar view of a modification of Figure 15; and

Figure 17:
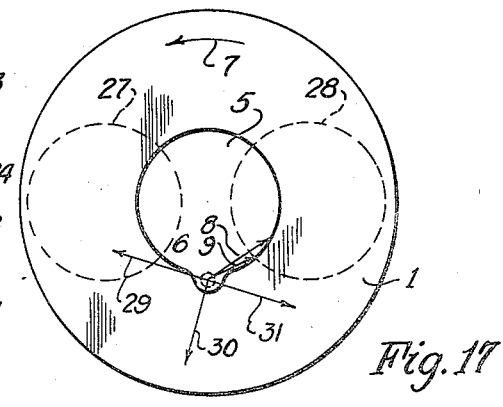

Figure 17 is a similar view of a still further modification.

Figure 1:
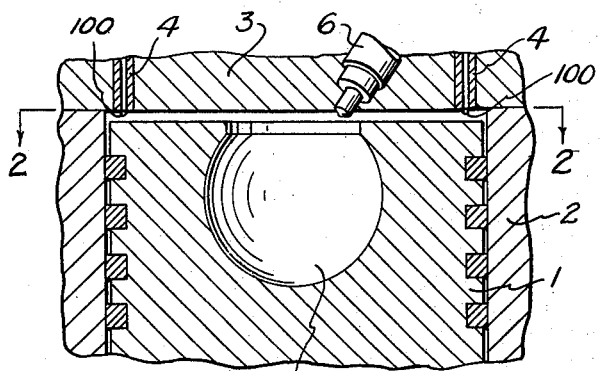
Figure 1 is a cross-sectional view through a cylinder having a piston therein and a cylinder head, the piston being shown at top dead center.

As shown in Figure 1, the piston 1 is slidably mounted in cylinder 2. Cylinder head 3 contains secondary fuel nozzles 4 by means of which fuel is introduced into the disc space between the upper dead center of the piston and the cylinder head. Piston 1 contains the main combustion chamber 5. The main fuel nozzle 6 injects fuel in the direction of the air swirl as shown by arrow 7, the fuel jets 8 and 9 depositing a film of fuel on the wall of chamber 5. According to this invention, a small quantity of fuel emerges from nozzles 4 in the form of drops 100. The air swirl in the space between the piston and cylinder head has a helical or radial movement toward the center of the cylinder and entering chamber 5. This air movement is the strongest just before the piston reaches top dead center and sweeps the fuel drops 100 from nozzles 4. Either one or several nozzles 4 are used, all depending upon the size of the cylinder.

The operation can be such that combustion will take place simultaneously in the disc space and in chamber 5. However, it is preferred to cause an advance combustion in the disc space and to use the pressure thus created to force the unused air from the disc space into chamber 5 so that it joins the air already present in chamber 5 for mixing with the fuel and taking part in the main combustion. It is preferred that the combustion in the disc space takes place according to the principles of combustion in chamber 5.

Thus a feature of the invention is to apply the fuel introduced in the disc space as a film on the flat or slightly dome-shaped piston head so that the air sweeps over this fuel film.

Another feature of this invention lies in the forming of the films of fuel in the area of the largest air volumes in the disc space. These areas are especially those in the vicinity of the valve pockets. When the film is formed in these areas, it is insured that sufficient air is available for mixing with the fuel introduced into the disc space. Furthermore, because of the advance combustion in the disc space, the pressure produced can shove unused combustion air into chamber 5. This effect can be effectively achieved when the fuel film is spread on the piston head adjacent the cylinder wall. Consequently, the air between the cylinder wall and the ordinarily centrally located combustion chamber opening in the piston which has not entered into the advance combustion is forced into the combustion chamber.

Figure 3:
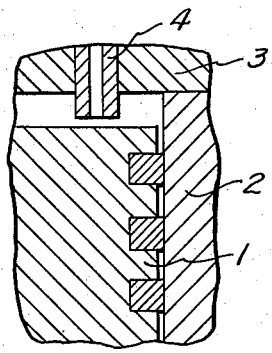
Figure 3 is an enlarged view of a detail of Figure 1.
Figure 2:
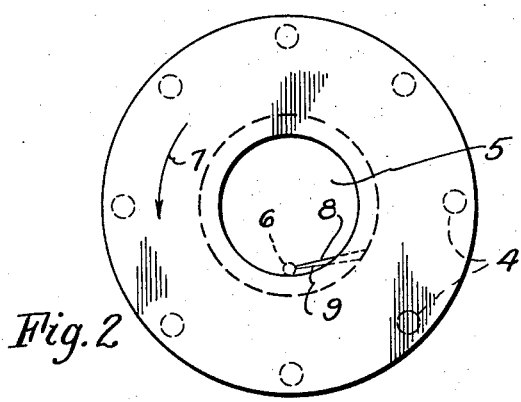
Figure 2 is a cross-sectional view on the line 2—2 of Figure 1.

The spreading of the film of fuel on the piston head is helped if the fuel for the disc space is introduced by one or more nozzles which extend below the cylinder head as shown in Figure 3. Nozzle 4 is projected almost to the surface of the head of piston 1. Consequently, the distance between the nozzle orifice and the top dead center position of the piston is small and the fuel contacts the piston head at a flat angle. In addition to the air swirl, a mechanical squeezing effect occurs which places the fuel away from the nozzle of the disc space.

In order to divide the entire combustion in the cylinder into an advance combustion occurring in the disc space and the main combustion in chamber 5, another feature of the invention is in that the fuel for the advanced combustion is introduced by the pairs of diametrically opposed nozzles which are uniformly positioned around the circumference of the cylinder. The fuel for the advanced combustion is not atomized when introduced and is forced into the disc space at a pressure slightly above the air pressure in the cylinder at top dead center. By so introducing the fuel, it remains in the form of drops on the nozzle orifice and can be removed by means of the air swirl, and the fuel can be squeezed away from the nozzles when the nozzles extend close to the surface of the piston head. This enables the fuel to spread as a film on the piston. Furthermore, the combustion air is locally strongly heated because of the narrow gap between the nozzle orifice and the piston head. The fuel when meeting with the hot air undergoes a fast local reaction which forces the rest of the air in the disc space radially toward the center and to the combustion chamber 5. The oxygen content of the air in the disc space is atomized partially in chamber 5 and partially in the combustion in the disc space.

The time of forming the drops 100 on the nozzle orifices can be chosen as desired. The drops can be formed during the suction stroke or during the compression stroke. Therefore, the vacuum in the cylinder can be used for forming the drops.

Figure 4:
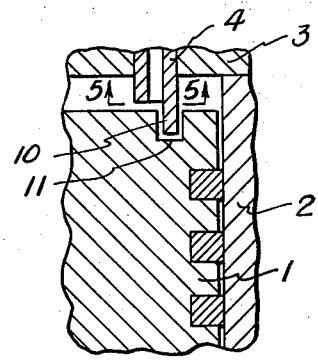
Figure 4 is a view similar to Figure 3 of a modified form of the invention.
Figures 5, 6, 7:
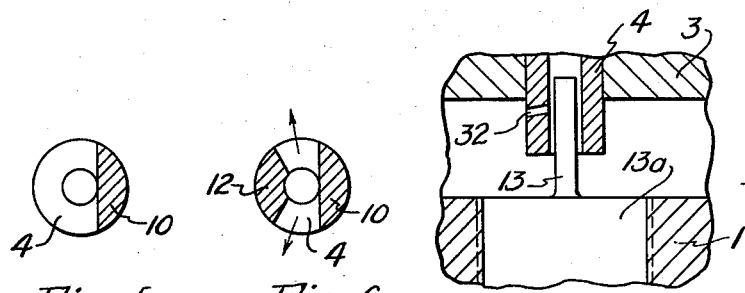
Figure 5 is a cross-sectional view on the line 5—5 of Figure 4.
Figure 6 is a modification of Figure 5.
Figure 7 is a further modification of the invention shown in Figures 3 and 4.

As shown in Figure 4, the nozzle 4 contains a bottom flange 10 in order to keep the fuel from reaching the wall of cylinder 2. A complementary recess 11 is formed in the head of piston 1. In Figure 6, the nozzle, in addition to the flange 10 of Figures 4 and 5, is given an additional flange or deflector 12 in order to confine the squeezing effect in the directions shown by the arrows. As seen in Figure 7, the squeezing of the fuel is improved by means of a plunger 13 mounted on a base 13a in Figure 1. As the plunger enters nozzle 4, the fuel is forced out through one or more bores 32. This enables the use of larger nozzle bores which are not readily clogged by caking.

The tilting of the piston, shown in exaggerated form in Figure 8, can be used to obtain a good distribution of the fuel in the disc space. A rotational effect, as shown by arrow 14, is given the connecting rod 15 and causes a slight tilting of piston 1, as shown by arrow 16. The edge 17 of piston 1 contacts the wall of cylinder 2 on the up stroke, and this contact can be made more positive by special constructions. At top dead center, the piston tilts in the opposite direction on the down stroke. As shown in Figure 9, the fuel for the disc space can be introduced through nozzle 18 which is mounted in the cylinder wall on the side where the piston head contacts the cylinder wall and at such a height that the piston head when tilted removes the fuel drop from the orifice of nozzle 18. The fuel removed by edge 17 is carried into the disc space and is mixed with the air swirl.

In Figures 10 and 11, one or more nozzles are mounted in the cylinder wall in the range of the piston stroke. Nozzle 19 is mounted tangentially to the cylinder wall 19a radially of the cylinder. The air swirl is in the direction of arrow 20, but could be in the opposite direction. Nozzle 21 is mounted in a small recess 22 in the wall of cylinder 2 which permits fuel jets to be injected in two directions. When a timely controlled fuel jet emerges from one of these nozzles, the up stroke of piston 1 will strike the fuel which becomes deposited on the surface of the piston head and carried along. The swirling air movement about the cylinder axis mixes with the fuel as it is vaporized, and because of the longer time given for the mixing, a fast ignition and combustion is obtained. The nozzles 19, 19a and 21 are preferably located about halfway between the top dead center and bottom dead center positions of the piston. The fuel is deposited as a film, especially on the outer portions of the piston head surface. Also, the ignition of the fuel is effected in advance of the ignition in chamber 5 so that the air in the disc space is very advantageously forced into the combustion chamber.

In Figure 12, the local heating is more effectively achieved than shown in Figures 3 and 4. This form is shown in modified forms in Figures 13, 14, 15 and 16, respectively. Piston 1 has a projection 23 which fits as snugly as possible in a complementary recess 24 in the cylinder head, as shown in Figures 12 and 13. One or more bores 25 extend from the recess into disc space 26. These bores are not used if especially good ignition conditions are to be obtained. Projection 23 reaches as closely as possible to the bottom of recess 24 to produce a local high compression. Fuel is injected through nozzle 4 into recess 24 and is forced through bores 25 partly by being displaced by projection 23 and partly because of the self-ignition occurring in recess 24.

In Figures 13 and 14, the same principle of Figure 12 is used with the projection 23 being radially inset toward the center of the piston, as in Figure 13; and in Figure 14, the projection 23 is mounted on the cylinder head and the complementary recess 24 in the piston. The radial inset for the projection and recess should be up to about 15 percent of the radius of the cylinder.

In Figure 15, the cylinder head is shown as seen from the cylinder. The recesses 24 are continuous between the pockets beneath the intake and exhaust valves 27 and 28 to force fuel into the valve pockets. Additional bores 103 extend from the recess to the pockets. The construction of Figure 15 is especially useful for large cylinders. For small cylinders, the recesses 24 are reduced to angular bores, as shown in Figure 16 into which extend round projections 23.

In Figure 17, the disc space is provided with fuel directly from the main nozzle 6. Jets 8 and 9 are directed into the main combustion chamber 5. Jets 29, 30 and 31 provide the fuel in the disc space, which fuel is carried by the air swirl in the direction of arrow 7 throughout the disc space and valve pockets from the film formed on the piston head.

Having now described the means by which the objects of the invention are obtained, I claim:

1. A method of operating a self-ignition engine in which the fuel is injected into the combustion chamber in a piston with the major portion of the fuel forming a film on the wall of said chamber, vaporized and mixed with a combustion air swirl, and the minor portion of the fuel being atomized in the combustion air for self-ignition, comprising injecting a part of the major portion of the fuel directly into the air space between the cylinder head and the top dead center position of the piston, as a film on the surface of the piston head and in the path of the swirling combustion air.

2. A method as in claim 1, further comprising spreading said part of the fuel as a film on the surface of the piston head in the vicinity of the valve pockets.

3. A method as in claim 2, further comprising spreading said part of said fuel on the surface of the piston head adjacent the cylinder wall.

4. A method as in claim 1, comprising injecting said part of the major portion of the fuel as drops in the path of the combustion air swirl.

5. A method as in claim 1, said part of the major portion of the fuel comprising not more than 25 percent of the total injected fuel.

6. An internal combustion engine having a cylinder, a piston having a piston head slidable in said cylnider, a combustion chamber in said piston head, a cylinder head, a main fuel nozzle in said cylinder head arranged to inject a major portion of the fuel upon the wall of the combustion chamber to form a fuel film thereon, and a second nozzle mounted in the engine and directed to inject a part of the major portion of the fuel as a film upon the surface of the piston head.

7. An engine as in claim 6, said second nozzle extending into the cylinder space between the cylinder head and the piston head.

8. An engine as in claim 6, said second nozzle comprising a pair of diametrically opposed nozzles.

9. An engine as in claim 6, said second nozzle having a screening flange projecting from the orifice of the nozzle and positioned between the orifice and the cylinder wall.

10. An engine as in claim 9, further comprising a recess in said piston head complementary to said flange.

11. An engine as in claim 6, said second nozzle extending into the space between the cylinder head and the piston head, a bore in said nozzle and directed transversely thereof, and a projection mounted on said piston in alignment with said nozzle and extending into said nozzle beyond said bore at the top dead center position of the piston.

12. An engine as in claim 6, further comprising a projection on said cylinder head adjacent the cylinder wall, and a complementary recess in said piston head into which said projection extends at the top dead center position of the piston.

13. An engine as in claim 12, further comprising a bore in the piston head extending from said recess through the surface of said piston head and toward the longitudinal axis of the piston.

14. An engine as in claim 13, said projection and recess being spaced from the cylinder wall not more than 15 percent of the radius of the piston.

15. An engine as in claim 6, further comprising a projection on the surface of said piston, and a recess in said cylinder head complementary to said projection and into which said projection extends at the top dead center position of said piston.

16. An engine as in claim 6, said second nozzle being located in the wall of said cylinder.

17. An engine as in claim 16, said second nozzle being positioned above the top dead center position of said piston.

18. An engine as in claim 16, said second nozzle being positioned approximately of the top and bottom dead center positions of said piston.

19. An engine as in claim 16, said second nozzle being mounted in a pocket in said cylinder wall.

20. A method as in claim 1, said part of the major portion of the fuel being injected through a secondary orifice in the main fuel nozzle.

References Cited in the file of this patent
UNITED STATES PATENTS 2,837,068  Lang _____ June 3, 1958